No. 743,436. PATENTED NOV. 10, 1903.
T. R. BOONE.
TAILOR'S MEASURING SQUARE.
APPLICATION FILED OCT. 31, 1902.
NO MODEL.

Witnesses
H. R. Selden.
C. J. Woodruff

Inventor
Thomas R. Boone
By Geo. B. Selden,
Attorney.

No. 743,436. Patented November 10, 1903.

UNITED STATES PATENT OFFICE.

THOMAS R. BOONE, OF ROCHESTER, NEW YORK.

TAILOR'S MEASURING-SQUARE.

SPECIFICATION forming part of Letters Patent No. 743,436, dated November 10, 1903.

Application filed October 31, 1902. Serial No. 129,597. (No model.)

*To all whom it may concern:*

Be it known that I, THOMAS R. BOONE, a citizen of the United States, residing at Rochester, in the county of Monroe, in the State of New York, have invented an Improved Tailor's Measuring-Square, of which the following is a specification, reference being had to the accompanying drawings.

My invention relates to an improved tailor's square or measuring instrument by which the operations of measuring and fitting garments are materially simplified and rendered more accurate.

My invention is fully described and illustrated in the following specification and the accompanying drawings, the novel features thereof being specified in the claims annexed to the said specification.

Figure 1:
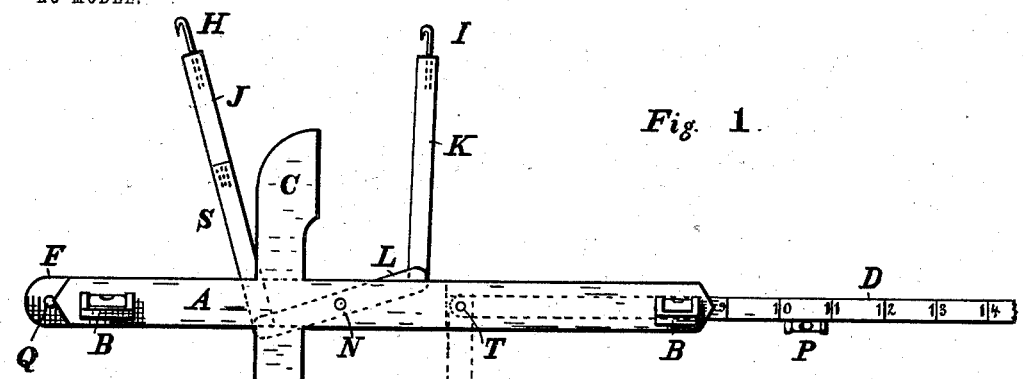
Figure 2:
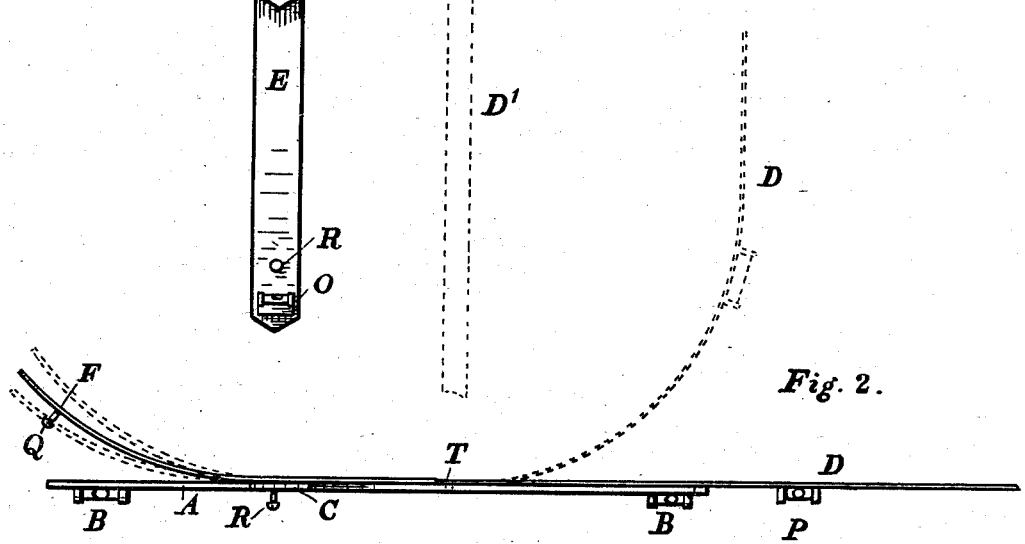
Figure 3:
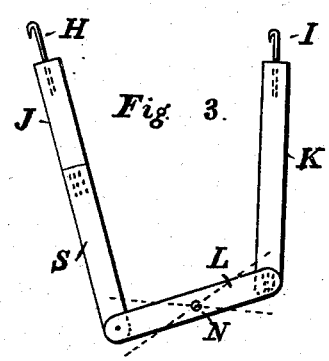

In the accompanying drawings, representing my invention, Figure 1 is a side view. Fig. 2 is a plan. Fig. 3 represents the adjusting yoke and connections.

My improved tailor's square or measuring instrument consists, essentially, of the stiff or rigid horizontal bar A, provided with one or more levels B, the vertical arm or shoulder-piece C, the flexible tape D for measuring the distance from the front of the arm to the center of the back, the depending vertical bar E, which may be flexible, and the flexible front arm F. The horizontal and vertical bars A and E are secured together at right angles, and the shoulder-piece projects upward from the horizontal bar opposite the vertical bar. In practical use the horizontal bar is passed under the arm of the person to be fitted, and the instrument is fastened in position by the hooks H and I, which are inserted in the clothes, one in front and the other behind the shoulder.

The instrument shown in the drawings is designed to be applied to the left shoulder of the person to be measured, because the tailor is usually right-handed. The shoulder-piece comes in front of the shoulder when the instrument is in use, and the flexible vertical arm being immediately below it is in a conveniently accessible position in front of the sleeve of the person being measured. The hooks H and I are connected with the bar A by the elastic or flexible straps J and K, attached to the ends of the movable connecting bar or yoke L, which is pivoted to the bar A at N. As the yoke L can swing freely on the pivot N, the instrument may be adjusted after having been attached to the person by the hooks H and I, so as to bring the bar A into the exact horizontal position determined by the level B, the other parts of the instrument moving with it. The front end of the rigid horizontal bar A serves as a handle for adjusting the instrument and carries the level in front in a position where its indications are easily observed. For convenience of observation from the front and back the horizontal bar A is provided with levels at both ends, and another level O, Fig. 1, may be applied at the lower end of the vertical bar E. These levels are of any ordinary type, comprising a sealed glass tube filled with a suitable liquid, except for a bubble of air, and supported in a suitable casing attached to the parts to which they are applied. The flexible tape or back measure D is also provided with the level P. As all these levels work in unison, there will be established for every different person measured an exact horizontal line and a vertical line corresponding with the bar E. The front arm F is flexible, of any suitable material, attached to the horizontal bar at its junction with the shoulder-piece C and bar E, and adapted to be bent around the breast of the person being measured, as indicated by the full and dotted lines in Fig. 2. The front piece F being flexible and attached to the bar A in the line of the shoulder-piece C or bar E is thereby adapted to be fitted to the body of the person, rendering it unnecessary to make the bar A flexible for that purpose. On the front piece F is placed the stud or measuring-point Q, and on the vertical bar E is placed the stud or measuring-point R, from which all the measurements necessary to the cutting of the garment are made except the distance to the seam at the middle of the back, which is measured by the flexible graduated tape D, which is bent around the person, as indicated by the dotted lines in Fig. 2. The instrument definitely locates and fixes the two measuring-points Q and R with reference to horizontal and vertical lines for each particular customer—the tall or short, slim or portly, erect or round-shouldered—and the requisite measurements may be made from the points thus established in many different ways according to the results which the tailor desires to obtain. The points Q and R maintain a constant relation to each other, except as the vertical bar E may be flexed to adapt itself to the form of the customer, and are, in effect, definitely-located positions, from which all the necessary measurements may be made on persons of all sizes and shapes with the certainty that the garments cut from such measurements will accurately cover and fit the figures measured. The shoulder-piece C may be extended a short distance behind the vertical bar E, as indicated in Fig. 1, for the purpose of preventing the garment from being cut too small from the center of the back to the front of the arm. The flexible strip J may be connected directly to the front end of the yoke L; but I prefer to connect it to the metallic strip S, riveted or otherwise attached to the yoke.

The flexible graduated tape or back measure D is pivoted to the horizontal bar at T, so that when not in use it may be allowed to hang down out of the way, as indicated by the dotted lines D', Fig. 1. The level P on the back-measure tape D insures that the measurements made by it are always in the proper relation with the measuring-points.

I claim—

1. The combination with the rigid horizontal bar, provided with the level, of the flexible vertical bar, the shoulder-piece above the vertical bar, the flexible front arm attached to the horizontal bar and projecting forward and inward, the measuring-points on the vertical bar and on the front arm, and the pivoted yoke having the hooks attached to its opposite ends, as and for the purposes set forth.

2. The combination with the horizontal bar, provided with the level, of the vertical bar, the flexible front arm, the measuring-points on the vertical bar and the front arm, and the pivoted yoke, having the hooks attached to its opposite ends, as and for the purposes set forth.

3. The combination with the horizontal bar, provided with the level, of the vertical bar, the flexible front arm, the measuring-points on the vertical bar and the front arm, the pivoted yoke having the hooks attached to its opposite ends, and the flexible graduated tape provided with the level, as and for the purposes set forth.

4. The combination with the vertical and horizontal members of a tailor's square, a yoke pivoted thereto and connections for attaching said yoke to a garment supported on a person's shoulder, whereby said square may be adjustably supported.

THOMAS R. BOONE.

Witnesses:
GEO. B. SELDEN,
C. T. WOODRUFF.